United States Patent Office 3,505,946
Patented Apr. 14, 1970

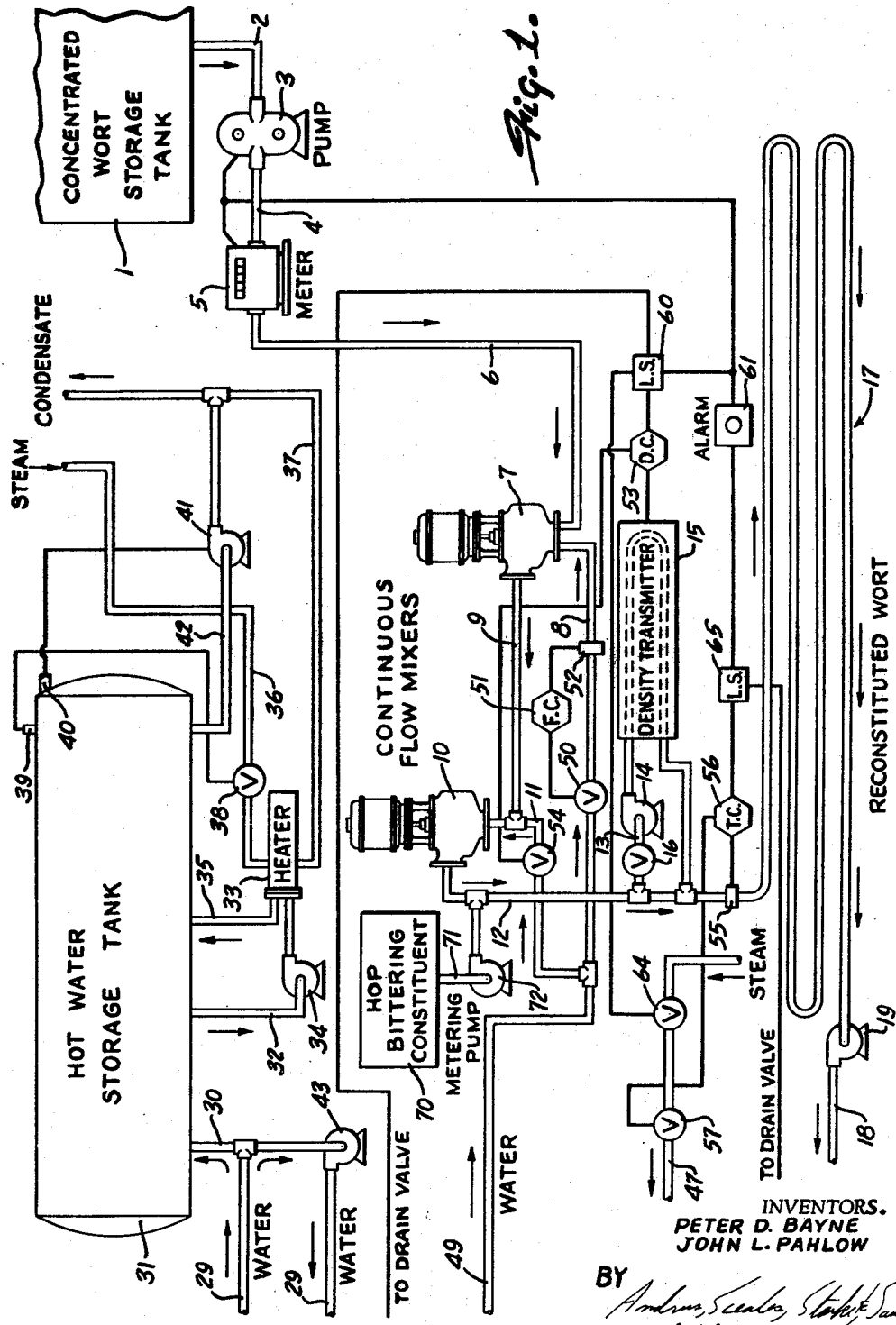

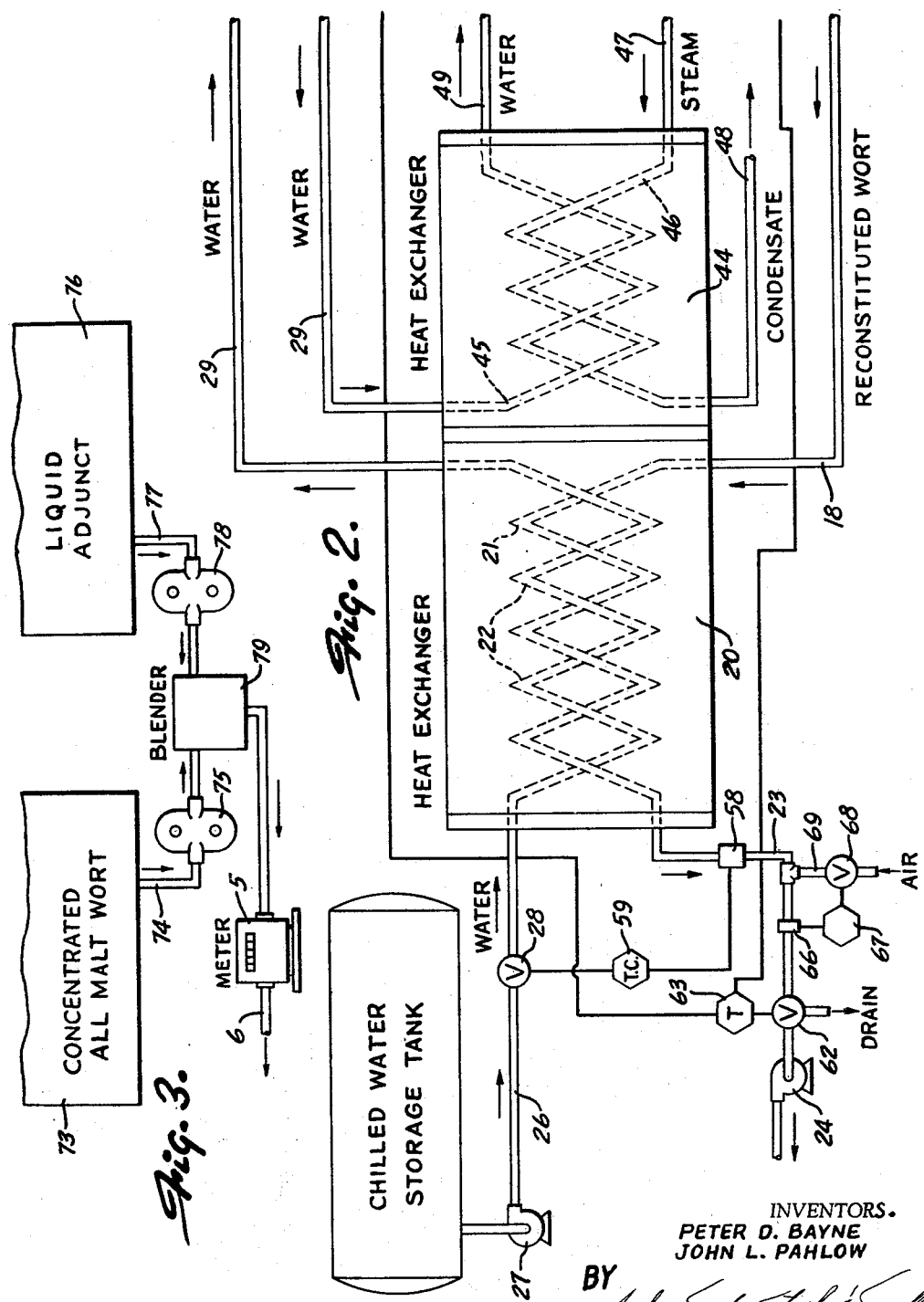

3,505,946
APPARATUS FOR RECONSTITUTING CONCENTRATED WORT
Peter D. Bayne, Shorewood, Wis., and John L. Pahlow, Granada Hills, Calif., assignors to Jos. Schlitz Brewing Company, Milwaukee, Wis., a corporation of Wisconsin
Original application Feb. 8, 1965, Ser. No. 438,147, now Patent No. 3,453,114, dated July 1, 1969. Divided and this application Jan. 8, 1969, Ser. No. 789,757
Int. Cl. C12c 7/00
U.S. Cl. 99—278      11 Claims

ABSTRACT OF THE DISCLOSURE

An apparatus for reconstituting concentrated wort. Concentrated wort having a solids content above 78% is passed through a closed system and a stream of water is continuously mixed with the concentrated wort to reconstitute the same. The reconstituted wort is then maintained in the closed flow system at a temperature above 140° F. for a period of time sufficient to sterilize the wort and thereafter immediately chilled to a temperature below 75° F.

---

This application is a divisional of application Ser. No. 438,147, filed Feb. 8, 1965 now Patent No. 3,453,114, filed July 1, 1969.

This invention relates to a process of brewing and more particularly to a process and apparatus for reconstituting concentrated brewer's wort.

Wort concentration has great potential and can offer advantages by increasing the production efficiency of existing plants, increasing production volume without a corresponding increase in capital expenditure and providing a simplification of both production processes and control of product uniformity without sacrificing quality of product.

More specifically, concentrated wort provides several distinct advantages. Brewhouse equipment generally works at peak capacity for only a few months of the year. By concentrating wort during off season periods a more efficient use of the facility results so that the brewhouse equipment can be used more efficiently throughout the year.

In addition, concentrated wort can be shipped to distant points where it can be reconstituted, fermented, finished in plants which can be built at relatively low cost because they do not require the expensive grain handling and brewhouse equipment. Moreover, weight savings can be realized by shipping the wort concentrate as opposed to shipping malt and raw grains required for conventional brewing.

A system of wort concentration and reconstitution has outstanding potential in conjunction with a continuous or accumulated batch fermenting system. Wort concentrate is stable in storage and the concentrate can be metered into the present system in the desired flow rate, reconstituted, and then passed directly into the continuous fermenting system without storage. Using the reconstituting system of the invention in conjunction with a continuous fermentation process averts the necessity of holding the reconstituted wort at temperatures and under conditions which might create microbiological growth. Moreover, combining the reconstituting system with a continuous fermentation system completely eliminates the necessity of large storage tanks and chillers for maintaining a supply of wort for fermentation and provides a substantial cost saving in plant and equipment design over that of conventional systems.

The concept of wort concentration provides an alternate approach to the problems that some brewers have attempted to solve by freeze concentration of beer. Wort concentrate, because it does not contain alcohol, does not present the legal ramifications which accompany freeze concentrated beer.

The present invention is directed to a continuous, high-capacity process for reconstituting concentrated wort. The wort is reconstituted without color gain, loss of hop bitter or alteration of flavor. According to the invention, concentrated wort at a temperature of from 60 to 120° F., but preferably under 150°, and having a solid's content of 80% is continuously pumped from a storage tank and/or shipping containers and passed into a mixing system. Deionized water, or filtered mains water, depending upon the purity of the water, is introduced into a mixer at a constant flow rate and is mixed with the stream of concentrated wort to partially reconstitute or dilute the wort. In some cases, particularly in high capacity installations, a second mixer in series may be employed and a second stream of either deionized water or filtered mains water is introduced into the second mixer down stream from the first mixer. This second or "breakdown" stream of water is continuously introduced at a variable flow rate and mixed with the partially reconstituted wort to complete the reconstitution to the fermentation gravity.

The flow of water into the second continuous flow mixer is controlled by a density control mechanism which continuously determines the density of the reconstituted wort and is operably connected to a valve in the flow line of the water entering the second mixer so that the flow rate of water is varied in accordance with the density to thereby provide a uniform density for the reconstituted wort.

After reconstitution, the wort is continuously pumped through a pasteurizing loop which serves to maintain the wort at a temperature above 140° F. for a period of time sufficient to kill any organisms that may be present in the wort. Following the pasteurization, the reconstituted wort is passed through a heat exchanger in heat exchange relation with chilled deionized water or filtered mains water which serves to cool the reconstituted wort before it is pumped to the fermenting tanks.

The water which is used to cool the reconstituted wort is subsequently heated by steam to a temperature dependent upon the pasteurization temperature (in the case of a 170° F. pasteurization temperature the water is heated to about 190° F.) and is then introduced into the continuous flow mixers to reconstitute the wort concentrate.

The present process also includes an alarm and drain system in which the flow or reconstituted wort is stopped and the system is automatically flushed clean without loss of product if the temperature or density of the wort varies outside of predetermined limits. This system automatically shuts off the flow of concentrated wort from the storage tank, but maintains the flow of water through the system so that the improperly processed batch of reconstituted wort can be flushed from the system.

The process of the invention is continuous and both the wort concentrate and the major portion of the water are mixed together at a constant rate. The final degree of reconstitution is provided by the secondary water stream and the flow of this stream is varied in accordance with the density of the reconstituted wort to thereby provide a uniform density.

The concentrated wort flows through a totally closed flow path so that there is no danger of oxidation or contamination during the process. As the process is continuous, there is no hold-up time for mixing or batching as is necessary with a batch type process. In addition, very precise density and temperature controls are employed so that the resulting fermented product has the identical organoleptic properties of the original wort.

With the use of the process of the invention, a number of beers with different flavor characteristics can be produced from either an unhopped or a lightly hopped wort concentrate. For example, by metering in different amounts of hop bittering constituents into unhopped or lightly hopped reconstituted wort, different bitterness levels can be produced from a standard or basic concentrated wort. In addition it is also possible to use a standardized, all-malt concentrated wort and blend varying amounts of a liquid adjunct into the basic concentrate to thereby produce different malt to adjunct ratios from one standarized wort concentrate.

Other objects and advantages will appear in the course of the following description.

The drawings illustrate the best mode presently contemplated of carrying out the invention.

In the drawings:

FIG. 1 is a partial flow sheet of the process of the invention;

FIG. 2 is a continuation of the flow sheet shown in FIG. 1; and

FIG. 3 is a portion of a flow sheet of a modified form of the invention.

FIGS. 1 and 2, in combination, are a flow sheet of the process of the invention. According to the process, concentrated wort is stored in one or more storage tanks 1 or in shipping containers. The wort in tank 1 has a temperature below 120° F. and normally about 85° F. and has a solids content above 78% and generally about 80%.

The concentrate is pumped from tank 1 through line 2 by a rotary pump 3 and is discharged through line 4 to a meter 5. Meter 5 measures the volume of wort being pumped through the system and is operably connected to the pump 3 so that when a given amount of wort has been passed through the meter, the meter will operate to stop the pump.

After leaving the meter 5, the wort concentrate flows through line 6 to the first of a pair of continuous flow mixers 7. The mixer 7 is a conventional type and serves to continuously mix heated water entering the mixer through line 8 with the concentrate to thereby partially dilute or reconstitute the wort. The water entering the mixer through line 8 has a temperature generally in the range of 150 to 210° F. and preferably about 190° F. In a high capacity process, two mixers are generally necessary to achieve satisfactory blending. However, in smaller systems, it is anticipated that one mixer will accomplish the dilution. In a smaller system a constant flow rate of water is mixed with the concentrate to provide a higher specific gravity than that desired for fermentation and the final dilution to the desired specific gravity is made in the fermenting tank.

The partially reconstituted wort then flows through line 9 to the second of the continuous flow mixers 10 which is identical in structure to mixer 7. Heated water is introduced to the mixer 10 through line 11 to provide a fully reconstituted wort which is discharged through line 12.

Following the reconstitution, a portion of the wort is pumped through line 13 by a pump 14 and passes through a conventional density measuring and transmitting mechanism indicated generally by 15. The density control unit 15 is a standard device such as a Honeywell U-Tube Specific Gravity Transmitter, which continuously weighs a given volume of the wort and provides a continuous determination of the density of the wort. The density control unit 15 generates a signal in accordance with the measurement of density, and the signal acts through a control mechanism to vary the flow of water through line 11 to mixer 10, as will be subsequently described.

As the density control unit 15 generally does not have sufficient capacity to continuously receive the entire stream of wort, only a portion of the wort flows through the loop 13. The amount of wort flowing through loop 13 can be controlled by valve 16.

The reconstituted wort then flows through a pasteurizing loop indicated generally by 17. The pasteurizing loop 17 consists of a long length of piping which is insulated so that there will be a minimum heat loss to the atmosphere. The wort flowing within the loop 17 is maintained at a temperature above 140° F. for a period of time sufficient to kill any organisms in the wort. Generally, for a high volume product run the wort will be maintained at a temperature of 170° F. for a period of about three minutes. As the temperature is decreased below 170° F., the pasteurizing time is increased so that a time of 15 to 20 minutes would be required for pasteurizing with a temperature of 140° F. In some instances, it might be feasible to pasteurize at 180° F. for one minute but this results in rather high steam consumption.

Following the pasteurization, the reconstituted wort is pumped through line 18 by a pump 19 and is passed through heat exchanger 20 in heat exchange relation with chilled water to thereby cool the reconstituted wort. As it is possible to get coloration or oxidation of the wort if it is held for too long a period at a high temperature, the wort is cooled by passing it through coil or circuit 21 in heat exchange relation with chilled deionized water flowing within coil 22 in heat exchanger 20. After leaving the heat exchanger 20, the cooled wort is pumped through the line 23 by a pump 24 to the fermenting tanks. The wort is then processed by conventional procedures. The water which is employed to reconstitute the wort may be either deionized by conventional equipment or filtered mains water may be used depending upon the purity of the water locally available. The chilled water, treated either by conventional means or deionization, is collected in storage tank 25 after chilling by conventional equipment to a temperature below 45° F. and preferably about 39° F.

In some cases, it is important that deionized water be used to reconstitute the wort, for the concentrate has its normal complement of minerals and metallic ions due to the fact that only water was evaporated from the wort during the concentration. If city water is added to reconstitute the wort, the resulting wort would have a double quantity of minerals which could have a toxic effect on the metabolism of yeast with the result that fermentation would be retarded. In addition, an increased mineral content would provide nuclei on which carbon dioxide can come out of solution very rapidly which results in gushing beer, and this is particularly true where the silica content of the water is high. In other cases, however, especially where soft water with low silica and carbonate content is available, deionization is not necessary and routinely filtered mains water can be used.

The chilled water is withdrawn from tank 25 through line 26 by pump 27 and the rate of flow of the water is controlled by a valve 28. As previously described, the chilled water flows through coils 22 in heat exchanger 20 and heat is transferred from the hot reconstituted wort to the chilled water to thereby heat the water flowing within the circuit 22. The heated water is then discharged through line 29 and a portion of the water flows through line 30 to a balancing tank 31. Under certain conditions more water is needed to cool the reconstituted wort than is required for reconstituting the wort and the excess water, over and above that which is required to reconstitute the wort, is stored in tank 31. The proportion of the water bypassed through line 30 to tank 31 is determined by the settings of the valves which control the flow of water to the mixers 7 and 10.

The hot deionized water returned to the balance tank 31 amounts to approximately 10 bbl./hr. for a 225 bbl./hr. system. This excess hot water is used for cleaning and pre-heating the system prior to start up. The bulk of it, however, is returned to the boiler as it is excellent quality make-up water.

To maintain the temperature of the water in the balancing tank 31 at the desired level, a portion of the water is continuously circulated through line 32 to a heater 33 by a pump 34 and is returned to tank 31 through line 35. The water flowing within the heater 33 is passed in heat conductive relation with steam to thereby heat the water and maintain the desired temperature.

Steam is supplied to the heater 33 through line 36 and the condensate is returned to the boiler through line 37. The flow of steam to heater 33 is controlled by a valve 38 which is operably connected to a conventional thermostat 39 in tank 31.

The water in tank 31 is maintained at a uniform level by a standard liquid level control 40 which is operably connected to a pump 41 in drain line 42 and the drain line 42 is connected to steam condensate line 37. When the liquid level exceeds a preset limit, the pump 41 will operate to withdraw water from the tank and maintain the preset level.

The heated water is pumped through line 29 by a pump 43 to heat exchanger 44. The heated water flows through coils 45 in heat exchanger 44 in heat exchange relation with steam flowing within the coils 46. Steam is introduced into the coils 46 through line 47 and the condensate is withdrawn through line 48. By passing the water in heat exchange relation with the steam in heat exchanger 44, the water is further heated to a temperature in the range of 150° F. to 210° F. and is discharged through line 49. The specific temperature to which the water is heated is dependent upon the pasteurization temperature used and the water temperature will generally be 10° to 20° F. above the pasteurization temperature. For example, if the pasteurization temperature is 170° F., the water discharged through line 49 will have a temperature of about 190° F.

A major portion of the heated water flows from line 49 through the line 8 to the mixer 7, while a smaller portion of the heated water will be bypassed through line 11 to the mixer 10. The proportion of water flowing within lines 8 and 11 can be varied, but generally the flow rate through line 8 is in the range of 6 to 8 times the flow rate through the secondary line 11.

The pump 3 serves to circulate the wort concentrate through the closed system at a constant rate, and similarly, the water flowing into the mixer 7 through line 8 flows at a constant rate. The flow in line 8 is controlled by a valve 50 which is operably connected to a conventional pneumatic control mechanism 51, such as a Honeywell indicator controller Model 204P1. The flow rate of water in line 8 is measured by a standard orifice flow measuring device 52 which generates and transmits a signal to control 51 in accordance with the flow rate of the water. The flow control unit 51 operates to open or close the pneumatic control valve 50 in accordance with the signal to provide the preset flow of water.

While the flow rate of water through line 8 is substantially uniform, the flow rate of water through line 11 is variable. The density measuring and transmitting unit 15 generates and transmits a signal to a conventional control unit 53, such as a Honeywell pneumatic controller Model 51311, in accordance with the density of the reconstituted wort, and the control unit is operably connected to valve 54 in line 11. The density control unit 53 is set or responsive to a given density for the reconstituted wort and serves to actuate or modulate a pneumatic control valve 54 in line 11 to vary the flow of water through line 11 and thereby maintain the preset density for the reconstituted wort.

A thermal probe or temperature measuring mechanism 55 is located in line 12 and is responsive to the temperature of the reconstituted wort. The thermal probe 55 is set for a given temperature and is operably connected through a standard control 56, such as a Honeywell Model 51311 controller, to a pneumatic control valve 57 in steam line 47.

The control unit 56 actuates the valve 57 to vary the flow of steam through line 47 and thereby regulates the temperature to which the water is heated in heat exchanger 44.

A second thermal probe 58 is located in line 23 and is connected through control 59, such as a Honeywell Model 51311 controller, to valve 28. The thermostat 58 is set for a given wort discharge temperature, and the control 59 acts to regulate the flow of chilled water to heat exchanger 20 to maintain this given or predetermined wort discharge temperature.

The present invention is also provided with a safety system in which the flow of reconstituted wort will be automatically stopped and the system automatically flushed clean without losing the product if either the temperature or the density of the wort exceeds preset limits. Excessive variations in temperature or density produced by a malfunction of the equipment can cause coloration or change in flavor of the wort and therefore it is necessary to remove the improperly treated wort from the system.

In this regard, the density control unit 53 is operably connected to a standard high-low limit switch unit 60 which is connected in the electrical circuit with the pump 3 and meter 5, and is also connected electrically to an alarm 61 and to a solenoid drain valve 62 in line 23. The limit switch unit 60 has minimum and maximum settings and when the density signal is outside of the minimum or maximum values the corresponding limit switch will open to stop the pump and motor. Opening of the limit switch will also energize the alarm 61, which can be a light or horn, and open the valve 62. A suitable timer 63 can be associated with valve 62 to provide a delay in opening valve 62. Normally the timer 63 is set for a period of about 3 minutes, so that opening of the valve 62 is delayed for a period of time sufficient to permit the wort in the pasteurizing loop 17 to flow through the system to the fermenting tanks, thus preventing the loss of good products.

The limit switch unit 60 is also connected in the electrical circuit with a solenoid valve 64 in steam line 47 so that a density outside of the preset limits will also close the steam valve.

With this construction, if the density of the reconstituted wort falls outside of the preset limits due to a malfunction of the equipment, the limit switch 60 will open causing the pump 3 and meter 5 to stop operation so that wort concentrate will not flow through the system. Opening of limit switch 60 will also close valve 64 in steam line 47 so that the water will not be heated. However, the water will continue to flow through the system.

After a time delay of about 3 minutes, drain valve 62 will open to discharge the improperly treated wort to the drain. The water flowing in the system will also be discharged through the drain and will flush all of the wort residue from the system. The water will continue to flow until manually shut off.

In addition to the density-actuated safety provision, a similar safety provision is included which is responsive to the temperature of the reconstituted wort. In this regard a high-low limit switch unit 65, similar to limit switch unit 60, is operably connected to the temperature control 55. Limit switch unit 65 is connected to pump 3, meter 5, alarm 61, steam valve 64 and drain valve 62 in a manner similar to that in which limit switch unit 60 is connected to these elements.

When the temperature of the reconstituted wort, as measured by thermal probe 56, falls outside the preset limits, the limit switch 65 will open to stop the pump 3 and meter 5, close steam valve 64 and energize the alarm 61. After a given delay provided by timer 63, the drain valve 62 will open to discharge the improperly heated wort into the drain line.

The process of the invention also includes a provision for measuring the dissolved oxygen content of the reconstituted wort and adding sterilized air to the wort to provide a uniform dissolved oxygen content. As shown in FIG. 2, a conventional oxygen sampling unit 66 is connected in line 23 and measures the dissolved oxygen content of the reconstituted wort. Sampling unit 66 generates a signal which acts through control unit 67 to open and close valve 68 in air line 69 to provide a uniform dissolved oxygen content for the wort.

The present invention provides a continuous process for reconstituting wort concentrate having precise density and temperature controls. By mixing heated water with the concentrate, a more efficient reconstitution is achieved. Subsequently, after the wort has been fully reconstituted, it is passed through a pasteurizing zone which serves to kill any organisms which may be present in the concentrate.

The process has a high thermal efficiency in that the reconstituted wort is cooled before flowing to the fermenting tank by chilled deionized water and this serves to almost completely preheat the water to the temperature at which it is to be introduced into the continuous flow mixers.

Deionized water may be used to reconstitute wort so that the resulting wort will have identical coloration, flavor characteristics and fermentation kinetics with that of conventionally produced wort.

The process of the invention has distinct advantages when used with a continuous fermentation system. In this situation, the line 23 would be connected directly to the continuous fermentation system so that the reconstituted wort would flow into the fermentation system without the necessity of storage. By flowing the reconstituted wort directly into the continuous fermentation system, the possibility of microbiological growth is eliminated during storage prior to being metered into the system. In addition, by flowing the reconstituted wort directly into the continuous fermenting system, the large storage tanks and chillers for maintaining a supply of wort for continuous fermentation are eliminated.

As an added feature of the invention, hop constituents can be added to the reconstituted wort to provide different bitterness levels for different brands of beer. For example, the wort storage tank 1 can contain either an unhopped wort concentrate or a lightly hopped wort concentrate and after reconstitution, hop bittering constituents can be added to the reconstituted wort in the desired amount to provide the desired bitterness level. As shown in FIG. 2, the hop bittering constituents are contained in a suitable tank or vessel 70 which is connected by line 71 to the flow line 12. A suitable metering pump 72 is located in line 71 and serves to add the desired proportion of the hop bittering constituents to the reconstituted wort. By adding the hop constituents to an unhopped or lightly hopped wort, it is possible to produce a number of different brands from a single concentrated wort.

FIG. 3 shows a modified form of the invention in which an all-malt concentrated wort is employed and an adjunct concentrate or syrup is blended into the all-malt concentrated wort. As shown in FIG. 3, the all-malt concentrated wort is stored in a tank 73 and is withdrawn through the tank through line 74 by a pump 75. The adjunct concentrate is stored in a similar tank 76 and is withdrawn from the tank through a line 77 by pump 78. The wort concentrate and adjunct concentrate are mixed in a blender 79 and then conducted to meter 5, as in the first embodiment. The blender 79 may be of the type described in Patent 2,601,018.

By using an all-malt concentrated wort, as shown in FIG. 3, and blending in varying amounts of adjunct, the malt-adjunct ratio can be altered as desired for each product brand. When the adjunct concentrate is employed along with the hop bittering constituent addition, through the line 71, it is possible to produce a wide variety of flavor characteristics using a basic all-malt unhopped or lightly hopped concentrated wort. As previously mentioned, the malt-adjunct ratio can be varied by varying the ratio of the adjunct concentrate to the all-malt wort concentrate and similarly the hop character can also be varied by varying the amount of hop constituents added to the reconstituted wort through line 71.

A specific example of the process of the invention is as follows. Concentrated wort, at a temperature of 85° F. and a solids content of 80% was pumped at a flow rate of 25 barrels per hour from a 570 barrel epoxy-coated steel storage tank by a rotary pump. The wort concentrate was pumped through a syrup meter which measured the volume of the concentrate and then flowed through a four inch continuous flow agitator. Heated water at 190° F. and a flow rate of 175 barrels an hour was introduced to the agitator and mixed with the wort concentrate. The resulting partially reconstituted wort was pumped at a flow rate of 200 barrels per hour to a second continuous flow agitator and water at a temperature of 190° F. and a flow rate of 25 barrels an hour was introduced to the second agitator to completely reconstitute the wort.

A portion of the reconstituted wort was bypassed through the density measuring unit 15 which continuously measured the density of the reconstituted wort and transmitted a signal to a pneumatic controller which was operably connected to a valve in the heated water line leading to the second agitator to thereby regulate the flow of water to the second agitator.

The reconstituted wort at a temperature of 170° F. was then flowed through a retention or pasteurizing coil which consisted of 240 feet of six-inch stainless steel tubing and was maintained in the coil for a period of three minutes to pasteurize the wort.

Following the pasteurization, the wort having a temperature of 170° F. and a flow rate of 225 barrels per hour, was passed in heat exchange relation with chilled water at a temperature of 39° F. and a flow rate of 210 barrels per hour in a plate-type heat exchanger. The wort discharged from the heat exchanger had a temperature of 52° F. and a solids content of about 12% was then pumped to the fermenting tanks.

The water discharged from the heat exchanger had a temperature of 160° F. and had a flow rate of 210 barrels per hour. Ten barrels per hour of the water was bypassed to a hot water balance tank, while the remaining 200 barrels per hour were passed into a second heat exchange section in heat exchange relation with steam at a pressure of 6.5 p.s.i. The water was discharged from the second heat exchanger at a temperature of 190° F. and, as previously mentioned, the heated water was then introduced into both the first and second agitators, to continuously reconstitute the wort concentrate.

The reconstituted wort by chemical and physical analyses is identical when compared to the original wort prior to concentration and reconstitution. The resultant finished beer produced from reconstituted wort is identical organoleptically and by analysis when compared to a control beer made by conventional procedures.

We claim:

1. An apparatus for reconstituting wort concentrate, comprising a storage tank to contain concentrated wort, closed first conduit means connected to said storage tank, pumping means in said first conduit means for pumping the wort through said first conduit means at a substantially constant rate, mixing means located in said first conduit means, second conduit means for introducing heated water to said mixing means to reconstitute the wort, and means for maintaining the reconstituted wort at a pasteurizing temperature for a sufficient period of time to kill any organisms in said reconstituted wort.

2. The apparatus of claim 1, and including valve means in said second conduit means; and means responsive to the flow rate of water in said second conduit means and operably connected to said valve means for maintaining a substantially constant rate of flow of water through said second conduit means.

3. The apparatus of claim 1, and including heat exchange means for passing the reconstituted wort in heat exchange relation with chilled water to thereby cool the reconstituted wort and heat said water.

4. The apparatus of claim 3, and including second heat exchange means for passing the heated water in heat transfer relation with a heating medium to further heat the water in preparation for introducing the heated water into said first conduit means.

5. The apparatus of claim 1, and including temperature measuring means in said first conduit means and responsive to a minimum and maximum temperature of said reconstituted wort, drain means in said first conduit means, and actuating means operably connecting said temperature measuring means and said drain means for opening said drain means when the temperature falls outside said minimum and maximum temperatures to thereby drain the wort from said first conduit means.

6. The apparatus of claim 5, wherein said actuating means is also operably connected to said pumping means for stopping said pumping means when the temperature falls outside said minimum and maximum values, and timing means connected to said actuating means for delaying the opening of the drain means for a predetermined period of time after said pumping means is stopped.

7. The apparatus of claim 1, and including density measuring means responsive to a minimum and maximum density of the reconstituted wort, drain means in said first conduit means, actuating means operably connecting said density measuring means to said drain means and to said pumping means for opening said drain means and stopping said pumping means when the density falls outside said minimum and maximum values to thereby drain said wort from said first conduit means, and timing means connected to said actuating means for delaying the opening of the drain means for a predetermined period of time after said pumping means is stopped.

8. An apparatus for reconstituting wort concentrate, comprising a storage tank to contain concentrated wort, closed first conduit means connecting said storage tank with a fermenting tank, pumping means in said first conduit means for pumping the wort through said first conduit means at a substantially constant rate, first mixing means located in said conduit means, second mixing means located in said first conduit means, second conduit means for introducing heated deionized water to said first mixing means to partially reconstitute the wort, third conduit means for introducing heated deionized water into said second mixing means to fully reconstitute the wort, valve means in said third conduit means, and density measuring means responsive to the density of the reconstituted wort and operably connected to said valve means for actuating said valve means in accordance with variations in density of reconstituted wort to maintain a substantially constant density for the reconstituted wort.

9. The apparatus of claim 8, wherein said density measuring means is responsive to a minimum and maximum density of the reconstituted wort, and said apparatus includes drain means in said first conduit means, and actuating means operably connecting said density measuring means and said drain means for opening said drain means when the density falls outside the minimum and maximum values to thereby drain said wort from said first conduit means.

10. An apparatus for reconstituting wort concentrate, comprising a closed flow system, means for continuously flowing concentrated wort having a solids content above 78% and a temperature below 120° F. through said closed flow system, means for continuously mixing a stream of water at a temperature above 150° F. with the concentrated wort to reconstitute the wort, sterilizing means comprising a part of said closed flow system for maintaining the reconstituted wort at a temperature above 140° F. for a period of time sufficient to sterilize said wort, and cooling means disposed in said closed flow system for chilling the sterilized wort to a temperature below 75° F.

11. The apparatus of claim 10, and including means for initially heating the wort to a temperature of 60° F. to 120° F.

References Cited
UNITED STATES PATENTS

| | | | |
|---|---|---|---|
| 1,995,626 | 3/1935 | Schreder | 99—276 X |
| 2,712,504 | 7/1955 | Coulter | 99—212 |
| 3,232,211 | 2/1966 | O'Malley | 99—278 |
| 3,298,835 | 1/1967 | Hildebrand | 99—50.5 |

ROBERT W. JENKINS, Primary Examiner

U.S. Cl. X.R.

99—52

UNITED STATES PATENT OFFICE
CERTIFICATE OF CORRECTION

Patent No. 3,505,946                                                    April 14, 1970

Peter D. Bayne et al.

It is certified that error appears in the above identified patent and that said Letters Patent are hereby corrected as shown below:

Column 2, line 10, "150°" should read -- 105° --. Column 6, line 41, after "valve" and before the (.), insert -- 64 --. Column 9, claim 8, line 44, before "conduit means," insert -- first --.

Signed and sealed this 15th day of September 1970.

(SEAL)
Attest:

Edward M. Fletcher, Jr.                              WILLIAM E. SCHUYLER, JR.
Attesting Officer                                            Commissioner of Patents